United States Patent Office

Re. 27,286
Reissued Feb. 15, 1972

27,286

METHOD OF HANDLING CREVICE-CORROSION INDUCING HALIDE SOLUTIONS

Octavian Bertea, Warren, Howard B. Bomberger, Jr., Canfield, and Layne F. Plock, Geneva, Ohio, assignors to RMI Company, Niles, Ohio No Drawing. Original No. 3,469,975, dated Sept. 30, 1969, Ser. No. 635,686, May 3, 1967, which is a continuation-in-part of Ser. No. 561,391, June 29, 1966. Application for reissue Mar. 26, 1970, Ser. No. 23,052
Int. Cl. C22c *15/00*
U.S. Cl. 75—175.5 7 Claims

Matter enclosed in heavy brackets [ ] appears in the original patent but forms no part of this reissue specification; matter printed in italics indicates the additions made by reissue.

ABSTRACT OF THE DISCLOSURE

A method of handling crevice-corrosion-inducing halide solutions such as sea water that involves containing the solution in a structure having a solution-contacting surface of an alloy of titanium with at least one of nickel, cobalt or molybdenum. The nickel, cobalt and molybdenum are present in amounts of up to 5.0% nickel, at least about 0.3% cobalt and at least about 2.0% molybdenum.

This application is a continuation-in-part of application Ser. No. 561,391, filed June 29, 1966, now abandoned.

This invention relates to the containment of halide solutions which induce crevice corrosion of unalloyed titanium and titanium alloys. The term "unalloyed titanium" as used herein refers to commercially pure titanium. The term "crevice corrosion" as used herein refers to corrosion between two metal surfaces such as a lap joint or between a metal and non-metal such as a Teflon gasketing material, or to corrosion which results from contact with a stagnant pool of solution.

There is a significant material problem with respect to the containment of halide-containing solution. Titanium compositions have been proposed for this application; however, it has been found that unalloyed titanium and titanium alloys, which are normally quite corrosion resistant, are prone to crevice corrosion when in contact with certain environments such as sea water, particularly at elevated temperatures. This problem is of considerable significance in the area of desalination since titanium would otherwise be an excellent material for sea water containers, tubes and other vessels. Thus, although titanium has been seriously considered for use in desalination plants, its susceptibility to crevice corrosion could affect its use in desalination plant design.

We have found through extensive investigation that the crevice-corrosion mechanism appears to involve concentration cells set up in crevices which cause a current flow or potential difference in adjacent portions of the titanium. The area undergoing corrosion is made anodic and the surrounding area is made cathodic. Because the attack is localized, the corrosion is further accelerated by the large ratio of cathode-to-anode areas.

Most titanium alloys have also been found to be prone to crevice-corrosion attack with one exception being a titanium alloy containing 0.2% palladium. While the palladium-containing alloy could be used in the production of components for desalination plants, its high cost and the limited availability of palladium renders large-scale use in this program somewhat impractical.

The problem of containing halide solutions is further complicated by the complete unpredictability of susceptibility to crevice corrosion. Thus, until the present invention, it has not been known how to satisfactorily contain crevice-corrosion-inducing solutions with titanium materials so as to obtain the physical advantages of titanium structures free of the undesirable vulnerability to crevice corrosion.

According to the invention, there is provided a method of handling crevice-corrosion-inducing halide solution which comprises containing said solution in a structure having a solution-contacting surface consisting essentially of an alloy of titanium having at least one element from the group consisting of nickel, cobalt and molybdenum, in amounts of up to about 5.0% nickel, at least about 0.3% cobalt, and at least about 2.0% molybdenum. Containers of the type described are capable of passing a critical definitive test. This test is conducted in a synthetic sea water solution at a temperature of 392° F. and measures the corrosion susceptibility over a test period of 96 hours. The sea salt solution used in the test is ASTM specification No. D–141–52.

We have found that when one or more of the aforementioned elements (nickel, cobalt and molybdenum) are incorporated in alloyed and unalloyed titanium in even relatively small quantities, they can be rendered fully resistant to crevice corrosion. The complete unpredictability of an element's effect on crevice corrosion resistance is dramatically demonstrated by the large number of titanium alloys which are found to be susceptible to crevice corrosion when subjected to the aforementioned corrosion test.

The crevice corrosion test is performed as follows. Test specimens are prepared by welding a 1-inch by 1-inch tab of test material to a 1-inch by 2-inch base of test material. The welds are made along the outer edge and form a metal-to-metal crevice between the tab and base. A completed test specimen is prepared by wet polishing the bottom surface of the base with 600 grit grinding paper. Two specimens are then wired together with titanium wire using a Teflon gasket between the two polished surfaces. This forms a metal-to-Teflon crevice which is more susceptible to crevice corrosion than the metal-to-metal crevice.

The completed test specimen is placed in a glass ampule, 50 ml. of synthetic sea water, and then the ampule is evacuated and sealed off. The ampule is then placed in an autoclave and heated to the test temperature for the desired testing period. After cooling and removing from the autoclave, the specimens are disassembled and examined for crevice corrosion at the metal-to-Teflon and metal-to-metal interfaces. The use of two specimens sandwiched together yields duplicate results in a single test.

The titanium alloys listed in Table I were all demonstrated to be susceptible to crevice corrosion in the aforementioned test using the ASTM synthetic sea water solution at 392° F. and an exposure period of 96 hours. It can be seen from an inspection of the alloys that the elements which normally improve the properties of titanium have little or no effect on the resistance of titanium to crevice corrosion. Also listed in Table I are other commercial alloys which also showed considerable corrosion in the corrosion test. All alloy components are given in percentage by weight.

TABLE I

Titanium alloys susceptible to crevice corrosion upon exposure in sea water at 392° F. for 96 hours A.—Binary alloys

| | | |
|---|---|---|
| Ti–0.2 Ag | Ti–2 Ce | Ti–10 Sn |
| Ti–2 Al | Ti–0.5 Cr | Ti–2 Ta |
| Ti–4 Al | Ti–1 Cr | Ti–1 V |
| Ti–8 Al | Ti–0.5 Cu | Ti–3 V |
| Ti–0.01 B | Ti–1 Cu | Ti–0.4 W |
| Ti–0.02 B | Ti–0.3 Fe | Ti–0.2 Y |
| Ti–0.05 B | Ti–1 Fe | Ti–1 Y |
| Ti–0.1 B | Ti–1 Mn | Ti–4 Zr |
| Ti–1.5 Cb | Ti–8 Mn | Ti–10 Zr |
| Ti–5 Cb | Ti–2 Sn | Ti–16 Zr |
| Ti–0.5 Ce | Ti–6 Sn | |

B.—Other alloys

| | |
|---|---|
| Ti–6 Al–4 V | Ti–4 Al–3 Mo–1 V |
| Ti–5 Al–2.5 Sn | Ti–6 Al–2 Cb–1 Ta |

In contrast to the above, we have found that, as hereinbefore discussed, crevice-corrosion-inducing halide solutions may be contained in titanium or titanium alloys virtually 100% resistant to crevice corrosion, if they have a small but effective amount of nickel, cobalt and molybdenum. The results reported in Table II of corrosion tests performed as described above but for exposure periods of from 96 to 528 hours clearly indicate the improvement obtainable by practicing the invention. The improvement obtained by the addition of molybdenum to titanium alloys, as shown in Table II, is representative of the improved resistance imparted by nickel and cobalt.

TABLE II.—TITANIUM ALLOYS RESISTANT TO CREVICE CORROSION IN SEA WATER

| Alloy | Temp., °F. | Time, hrs. | Remark |
|---|---|---|---|
| Ti-unalloyed | 392 | 96 | Tetal-Meflon interface badly corroded. |
| Ti-Ni (0.2, 0.4, 0.5, 1, 2 and 5%). | 392 | 96 | No corrosion. |
| Ti-Ni (0.2, 0.4, 0.5, 1, 2 and 5%). | 450 | 96 | Do. |
| Ti-Ni (0.2, 0.4, 0.5, 1, 2 and 5%). | 500 | 96 | Do. |
| Ti-Ni (0.1, 0.2, 0.5, 1, 2 and 5%). | 450 | 528 | Do. |
| Ti-Ni (0.1, 0.2, 0.5, 1, 2 and 5%). | 500 | 504 | Do. |
| Ti-Ni (0.1, 0.2, 0.5, 1, 2 and 5%). | 550 | 504 | Do. |
| Ti-Co (0.1, 0.2, 0.4, 0.8, 2 and 5%). | 392 | 96 | Metal-Teflon interfaces badly corroded on the Ti-0.1 Co and Ti-0.2 Co. No corrosion on other specimens. |
| Ti-Co (0.2, 0.4, 0.8, 2 and 5%). | 450 | 120 | Metal-Teflon interface badly corroded on the Ti-0.2 Co. No corrosion on other specimens. |
| Ti-Co (0.2, 0.4, 0.8, 2 and 5%). | 500 | 120 | Metal-Teflon interfaces badly corroded on the Ti-0.2 Co and Ti-0.4 Co. No corrosion on other specimens. |
| Ti-Mo (1,3 and 6%) | 392 | 96 | Metal-Teflon interface slightly corroded on the Ti-1 Mo. No corrosion on other specimens. |
| Ti-6Al-2Cb-1 Ta | 392 | 96 | Badly corroded at Teflon interface. |
| Ti-6Al2Cb-1 Ta (1% Mo) | 392 | 96 | Very slightly corroded at Teflon interface. |
| Ti-6Al-2Cb-1 Ta (2% Mo) | 392 | 96 | No corrosion. |
| Ti-6Al-3Cb | 392 | 96 | Badly corroded at Teflon interface. |
| Ti-6Al-3Cb (1% Mo) | 392 | 96 | No corrosion. |
| Ti-6Al-3Cb (2% Mo) | 392 | 96 | Do. |
| Ti-7Al-2Cb-1 Ta (1% Mo) | 392 | 96 | Very slightly corroded at Teflon interface. |
| Ti-7Al-2Cb-1 Ta (2% Mo) | 392 | 96 | No corrosion. |

As can be seen from Table II, nickel additions of up to 5% all suppressed the crevice corrosion of unalloyed titanium to the point where no corrosion was observed. This is in contrast to specimens of unalloyed titanium which were badly corroded at the test specimen surface under the same minimum test condition of temperature and exposure time.

Evaluation of the addition of cobalt to unalloyed titanium showed that at least about 0.3% cobalt would be necessary to fully preclude corrosion under the test conditions since additions of 0.1 to 0.2% cobalt still resulted in badly corroded specimens. As the temperature of the corrosive environment increases, somewhat larger amounts of cobalt are needed to prevent corrosion under these test conditions.

The molybdenum addition to unalloyed titanium must be made in somewhat larger quantities to prevent crevice corrosion. As the results in Table II show, some slight corrosion of the test specimen occurs with 1% mobybdenum addition, whereas the addition of 3% or more shows no evidence of corrosion. At least about 2% molybdenum would be used to prevent crevice corrosion.

In a similar manner, additions of nickel, cobalt and molybdenum improve the resistance of titanium alloys to crevice corrosion. Some alloys may require larger quantities of the additive. However, as can be seen, it is possible to considerably increase the usefulness of titanium alloys by practicing our invention.

Although, as has been shown, nickel, cobalt and molybdenum all suppress crevice corrosion, it is presently preferred to use nickel, particularly with unalloyed titanium. Very small amounts of nickel can provide complete corrosion protection, thus allowing the use of material with mechanical properties very similar to those of unalloyed titanium. The ductility and formability, therefore, would readily permit the manufacture of this material into tubes and other components using the same procedure as that used with unalloyed titanium. Tubes and other articles made of such materials having improved resistance to crevice corrosion may find application in many fields where they would be exposed to crevice-corrosion-inducing environments such as sea water, wet chlorine, etc. It is also apparent that the additives could be used to advantage in combination when desired. Thus, for example, all three of nickel, cobalt and molybdenum, or any two of them together, could be added to improve the properties of alloyed or unalloyed titanium.

We claim:

1. A method of handling crevice-corrosion-inducing halide solution, which method comprises containing said solution in a structure having a solution-contacting surface consisting of an alloy of titanium having included therein at least one element from the group consisting of nickel and cobalt in amounts of up to about 5% nickel and about 0.3% to 5% cobalt.

2. A method according to claim 1 comprising containing said solution in a structure consisting essentially of an alloy of titanium and 0.1 to 5.0% nickel.

3. A method according to claim 1 wherein said structure has a crevice-corrosion resistance sufficient to fully preclude crevice corrosion when exposed to a synthetic sea water solution at a temperature of 392° F. for a period of 96 hours.

*4. As an article of manufacture, a container or tube for handling crevice-corrosion-inducing halide solutions, said article having a solution-contacting surface consisting of a binary alloy of titanium and one element of the group consisting of nickel and cobalt in amounts of up to about 5% nickel and about 0.3% to 5% cobalt.*

*5. An article as defined in claim 4 in which said surface consists of a binary alloy of titanium and nickel.*

*6. An article as defined in claim 4 wherein the corrosion resistanec of said surface is sufficient to fully preclude corrosion when exposed to a synthetic sea water*

*solution at a temperature of 392° F. for a period of 96 hours.*

*7. An article as defined in claim 4 in the form of a tube composed of a binary alloy of titanium and nickel.*

References Cited

The following references, cited by the Examiner, are of record in the patented file of this patent or the original patent.

UNITED STATES PATENTS

| | | | |
|---|---|---|---|
| 2,645,575 | 7/1953 | Herres et al. | 75—175.5 |
| 2,880,087 | 3/1959 | Jaffee | 75—175.5 |
| 2,892,706 | 6/1959 | Jaffee et al. | 75—175.5 |
| 3,033,775 | 5/1962 | Chevigny et al. | 75—175.5 X |
| 3,156,590 | 11/1964 | Vordahl | 75—175.5 X |
| 3,257,211 | 6/1966 | Vordahl et al. | 75—175.5 X |

| | | | |
|---|---|---|---|
| 3,266,951 | 8/1966 | Vordahl | 75—175.5 X |
| 3,342,648 | 9/1967 | Zucker et al. | 148—11.5 |
| 3,370,946 | 2/1968 | Bertea et al. | 75—175.5 |
| 2,754,203 | 7/1956 | Vordahl | 75—175.5 |

OTHER REFERENCES

Transactions ASM, vol. 47, Preprint No. 3, 1954, pp. 3–1, 3–11.

Air Force Technical Report No. 6218, Part 2, 1950, Research and Development on Ti Alloys, BMI, pp. 34 and 35, June 1950.

CHARLES N. LOVELL, Primary Examiner

U.S. Cl. X.R.

23—87, 252; 29—183; 138—1; 206—84; 220—1